United States Patent Office 3,018,438
Patented Jan. 23, 1962

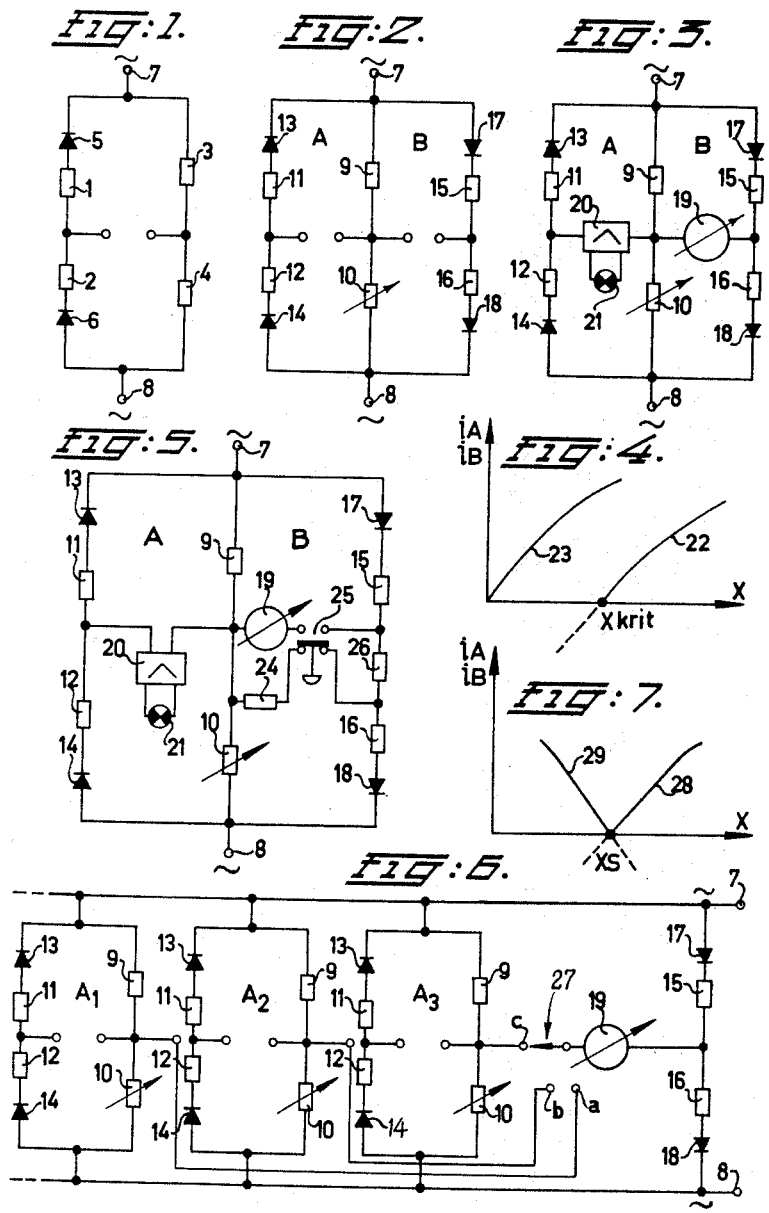

3,018,438
MULTIPLE HALF-WAVE DOUBLE BRIDGE CONNECTION HAVING ALTERNATING CURRENT SUPPLY AND DIRECT CURRENT OUTPUT
Rudolf Mustert, Oberwil, Zug, Switzerland, assignor, by mesne assignments, to N.V. Apparatenfabriek Plaisier, The Hague, Netherlands
Filed June 12, 1959, Ser. No. 819,901
Claims priority, application Switzerland June 21, 1958
1 Claim. (Cl. 324—57)

The invention relates to a control measuring device and more especially to a multiple half-wave double bridge having an alternating current supply and a direct current output.

A principal object of the present invention is to provide for a simple device for controlling the conductivity of liquids, such as solutions.

A number of feelers used in measuring and regulating techniques, such as, for instance, inductive automatics, and conduction and concentration feelers, need alternating current for their action, whereas for indication and for the controlling of regulating devices D.C. output current is desired. When such feelers are used in a bridge connection the rectification in the output of the bridge will cause difficulties. Low resistance rectifiers, for instance, will need a high intensity of current which cannot be supplied by the bridge, whereas the utilization of rectifiers which are fully loaded at a low intensity of current is often unsatisfactory on account of their high ohmic resistance. Moreover rectification in the bridge diagonal will fail when the bridge is most sensitive, when compensating at zero output. Further, in many applications, the dependency of the rectifier on ambient temperature is undesirable.

A further object of the invention is therefore to provide a bridge connection for the control of the conductivity of liquids, in which the aforesaid inconveniences are avoided.

Further objects realized in advantageous embodiments of the invention are to be seen in the compensation of the branches of the double bridge at different magnitudes in order to assign different functions to the controllers switched into the diagonal connection thereof and dependent on the values picked up by one feeler connected in the common branch of both bridges and in the preventing of polarizing effects on the feeler.

These and other objects and the means by which they are obtained will be better understood from the description given hereinafter with reference to the drawing, in which:

FIG. 1 is a diagram of a bridge connection consisting of a single bridge,

FIG. 2 is a diagram of a bridge connection consisting of two bridges,

FIG. 3 is a diagram of a bridge connection wherein the invention is applied,

FIG. 4 is a graphical representation relative to FIG. 3,

FIG. 5 represents another embodiment of the invention,

FIG. 6 is an embodiment being more bridges in parallel connection, and

FIG. 7 is a graphical representation relating to a further application of the invention.

FIG. 1 represents a known type of Wheatstone bridge comprising resistances 1, 2 and 3, a feeler 4 and rectifiers 5 and 6. A source of voltage (not shown) which is connected to the connecting terminals 7 and 8 supplies the bridge with alternating current. Alternating current passes through the bridge branches 3 and 4. The bridge branches 1, 5 and 2, 6 pass current for a half period, whereas and block current in the other half periods, so that for the second half period no current flows in the output. The arrangement thus serves as a bridge for a half period and can therefore be denominated a half-wave bridge. Thus, in this arrangement, a feeler charged with alternating current is capable of operating the half-wave direct current output of a bridge.

The rectifiers used with the arrangement need possess sufficiently good blocking properties. Thus appropriate blocking layer rectifiers can be used such as, for instance, silicon-dioxide-blocking layer rectifiers or contact rectifiers. As the described bridge connection only acts for a half period, the feeler 4 positioned in a branch of the bridge charged with alternating current can also operate a second bridge, which then can have another function, for the next other half period.

FIG. 2 shows such a bridge connection. It consists of two bridges A and B, which have in common two bridge branches charged with alternating current and constituted by a resistance 9 and a feeler 10. The bridges A and B contain further the resistances 11, 12 and the rectifiers 15, 16 and the resistors 15, 16 and the rectifiers 17, 18 respectively. As seen in FIG. 2, the rectifiers 13 and 14 are oppositely connected with respect to the rectifiers 17 and 18. With opposite poling of the rectifiers, the beginning of the working phase of the branches 11, 13 and 12, 14 will be at the end of the working phase of the branches 15, 17 and 16, 18. Consequently two functionally independent and compensatory bridges with D.C. current output are obtained, which have the alternating current side in common and which each work with a half wave of the supply current. Such an arrangement can be indicated as a half-wave double bridge. In principle each of the six bridge resistances 9 to 12, 15 and 16 may be variable and can be used as a feeler.

FIG. 3 represents an example of the application of the wiring diagram according to FIG. 2 for measuring and indicating the conductivity of a medium, wherein the feeler 10 is immersed. The latter value picked up by the feeler 10 is measured through a measuring instrument 19 situated in the bridge B, the checking being effected by an alarm device 21 which is actuated through an amplifier 20 situated in the bridge A. The alarm device must respond, if the conductivity surpasses an utmost admissible value $x$-crit. For that purpose, the bridge A is compensated at $x=x$-crit and has its positive output $i_A$ for $x>x$-crit as indicated by curve 22 in FIG. 4. The negative output shown in dotted lines for the values $x<x$-crit is of no significance for the amplifier. The bridge B on its part has such values, that it is compensated at the value $x=0$. For the values $x>0$, there appears then a continuous output current $i_B$ corresponding to the deviation from equilibrium as indicated by curve 23 in FIG. 4, and which through the measuring instrument 19 is used for indicating the magnitude $x$.

Because of the different compensation values in the bridges A and B a slight asymmetry of the passage of current in both half waves will occur which under circumstances may cause polarization at the immersed poles of the feeler 10. FIG. 5 shows a half-wave double bridge operated by a conduction feeler which is symmetrical as long as in continuous service the output of the bridge B connected through a resistor 24 is used. In this working condition both bridges A, B, are compensated at the alarm point $x$-crit. The resistance 24 is so dimensioned that the output current of the bridge B equals that of the bridge A. In order to carry out measuring by pushing a button 25 the bridge diagonal containing the resistance 24, can be opened for a short time and another bridge diagonal comprising the measuring instrument 19 can be closed whereby simultaneously by means of a resistance 26 the transition of the compensation of the bridge B from the alarm point $x$-crit to the value $x=0$ is effected and the measuring is performed corresponding to the curve 23 in FIG. 4.

Both bridges A and B in FIG. 3 being independent from each other, one of these bridges can be separated and connected again, without influencing the function of the other bridge. Therefore, as shown in FIG. 6, it is possible to complete at will any number of bridges $A_1$, $A_2$, $A_3$ . . . operating alarm devices by a double branch 15, 17, 16, 18, using the other half wave, so that each time double bridges are formed. In equal poling of the bridges $A_1$, $A_2$, $A_3$ . . . and with oppositely poled double branches 15, 17, 16, 18 the latter can be fixedly connected to the supply voltage 7, 8 so that the completion to double bridges involves at any time only the effecting of the corresponding diagonal connection, containing the measuring instrument 19, which can be done with the aid of a switch 27.

A further application of the half-wave double bridge presents itself if the compensation of the bridge A is accomplished according to the curve 28 of FIG. 7 and that of the bridge B according to the curve 29. As a result the bridge A will supply an output current when the desired resistance value $x_s$ of the feeler 10 is understepped and the bridge B will supply an output current when the desired value $x_s$ is surpassed, the said output current being applicable for effecting correcting regulating operations.

What I claim is:

Apparatus comprising: first and second energizing terminals for receiving an alternating current; a plurality of half-wave bridges connected between said energizing terminals, each of said half-wave bridges including first and second branches connected in series between said energizing terminals and third and fourth branches connected in series between said energizing terminals, said first and second branches each including an impeder and a unidirectional conducting device, each of said unidirectional conducting devices being polarized to conduct current only in a direction from said first energizing terminal to said second energizing terminal, each of said third branches being an impeder, each of said fourth branches being a variable impeder, first output terminal means connected to the junction of said first and second branches and second output terminal means connected to the junction of said third and fourth branches; fifth and sixth branches connected in series between said first and second energizing terminals, each of said fifth and sixth branches including an impeder and a unidirectional conducting device, said unidirectional conducting devices being polarized to conduct current only in a direction from said second energizing terminal to said first energizing terminal; a bridge balance detecting means having first and second input terminals; means for connecting said first input terminal to the junction of said fifth and sixth branches; a switch having one moving contact and a plurality of fixed contacts; means for connecting the moving contact of said switch to said second input terminal; and means for connecting each of said fixed contacts to each of said second output terminal means respectively.

References Cited in the file of this patent

UNITED STATES PATENTS

| | | |
|---|---|---|
| 2,370,609 | Wilson et al. | Feb. 27, 1945 |
| 2,504,965 | Davis | Apr. 25, 1950 |
| 2,508,446 | Conant | May 23, 1950 |
| 2,928,406 | Cunniff et al. | Mar. 15, 1960 |

FOREIGN PATENTS

| | | |
|---|---|---|
| 668,142 | Great Britain | Aug. 25, 1950 |
| 131,247 | Sweden | Apr. 10, 1951 |